United States Patent
Marzban et al.

(10) Patent No.: US 12,490,265 B2
(45) Date of Patent: Dec. 2, 2025

(54) RESOURCE EFFICIENT COMMON SEARCH SPACE MONITORING

(71) Applicant: QUALCOMM Incorporated, San Diego, CA (US)

(72) Inventors: Mohamed Fouad Ahmed Marzban, San Diego, CA (US); Wooseok Nam, San Diego, CA (US); Tao Luo, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 495 days.

(21) Appl. No.: 18/049,893

(22) Filed: Oct. 26, 2022

(65) Prior Publication Data

US 2024/0147475 A1 May 2, 2024

(51) Int. Cl.
*H04W 72/20* (2023.01)

(52) U.S. Cl.
CPC ................... *H04W 72/20* (2023.01)

(58) Field of Classification Search
CPC ..... H04W 72/20; H04L 5/0092; H04L 5/0053
See application file for complete search history.

(56) References Cited

U.S. PATENT DOCUMENTS

| | | | | |
|---|---|---|---|---|
| 2013/0303203 A1* | 11/2013 | Wang | ............ | H04W 68/00 455/458 |
| 2014/0295820 A1* | 10/2014 | Kim | ............ | H04W 52/0225 455/418 |
| 2015/0327224 A1* | 11/2015 | Guan | ............ | H04W 48/12 370/329 |
| 2017/0201306 A1* | 7/2017 | Shimezawa | ............ | H04B 7/0626 |
| 2018/0020418 A1* | 1/2018 | Chandramouli | ............ | H04W 76/16 |
| 2019/0123923 A1* | 4/2019 | Belleschi | ............ | H04W 4/40 |
| 2019/0327762 A1* | 10/2019 | Takeda | ............ | H04L 5/0048 |
| 2019/0349897 A1* | 11/2019 | Hosseini | ............ | H04W 72/51 |
| 2020/0053757 A1* | 2/2020 | Bagheri | ............ | H04L 5/10 |
| 2020/0205163 A1* | 6/2020 | Nam | ............ | H04W 74/006 |
| 2021/0068009 A1* | 3/2021 | Van Phan | ............ | H04W 4/70 |
| 2021/0076361 A1* | 3/2021 | Takeda | ............ | H04L 5/0053 |
| 2021/0204244 A1* | 7/2021 | Rune | ............ | H04L 5/1469 |
| 2021/0274555 A1* | 9/2021 | Alfarhan | ............ | H04W 74/0833 |
| 2021/0345398 A1* | 11/2021 | Cao | ............ | H04W 56/0045 |
| 2021/0360421 A1* | 11/2021 | Wang | ............ | H04W 74/006 |
| 2023/0070233 A1* | 3/2023 | Shrivastava | ............ | H04W 76/27 |
| 2023/0319901 A1* | 10/2023 | Ozturk | ............ | H04W 74/085 370/329 |
| 2024/0089974 A1* | 3/2024 | Oteri | ............ | H04L 5/0092 |
| 2024/0107547 A1* | 3/2024 | Wu | ............ | H04W 72/23 |
| 2025/0008431 A1* | 1/2025 | Lai | ............ | H04L 5/001 |

* cited by examiner

*Primary Examiner* — Ayaz R Sheikh
*Assistant Examiner* — Tarell A Hampton
(74) *Attorney, Agent, or Firm* — QUALCOMM Incorporated

(57) ABSTRACT

Disclosed are methods and systems for monitoring control channel candidates in a common search space (or a common search space set) in a wireless communication network. One of the methods is performed at a user equipment (UE). The method comprises: determining a first set of parameters for configuring a first set of monitoring occasions for the UE to monitor control channel candidates in a common search space (CSS); transmitting, to a network entity, an indication indicating the first set of parameters; and monitoring control channel candidates in the CSS during the first set of monitoring occasions.

28 Claims, 11 Drawing Sheets

RESOURCE EFFICIENT COMMON SEARCH SPACE MONITORING

TECHNICAL FIELD

This application relates to wireless communication systems, and more particularly to techniques for monitoring control channel candidates in a common search space (or a common search space set) in a wireless communication network.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of network entities, each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology. For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum.

However, as the demand for mobile broadband access continues to increase, there exists a need for further improvements in the wireless communication technology. Preferably, these improvements should be applicable to a broad range of multi-access technologies and the telecommunication standards that employ these technologies.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication at a user equipment (UE) includes determining a first set of parameters for configuring a first set of monitoring occasions for the UE to monitor control channel candidates in a common search space (CSS); transmitting, to a network entity, an indication indicating the first set of parameters; and monitoring control channel candidates in the CSS during the first set of monitoring occasions.

In an additional aspect of the disclosure, a method of wireless communication at a network entity includes receiving, from a user equipment (UE), an indication indicating a first set of parameters determined by the UE for configuring a first set of monitoring occasions to monitor control channel candidates in a common search space (CSS).

In an additional aspect of the disclosure, a first wireless communications device configured to determine a first set of parameters for configuring a first set of monitoring occasions for the UE to monitor control channel candidates in a common search space (CSS); transmit, to a network entity, an indication indicating the first set of parameters; and monitor control channel candidates in the CSS during the first set of monitoring occasions.

In an additional aspect of the disclosure, a first wireless communications device configured to receive, from a user equipment (UE), an indication indicating a first set of parameters determined by the UE for configuring a first set of monitoring occasions to monitor control channel candidates in a common search space (CSS).

In an additional aspect of the disclosure, a non-transitory computer-readable medium having program code recorded thereon, the program code includes code for causing a first wireless communications device to determine a first set of parameters for configuring a first set of monitoring occasions for the UE to monitor control channel candidates in a common search space (CSS); transmit, to a network entity, an indication indicating the first set of parameters; and monitor control channel candidates in the CSS during the first set of monitoring occasions.

In an additional aspect of the disclosure, a non-transitory computer-readable medium having program code recorded thereon, the program code includes code for causing a first wireless communications device to receive, from a user equipment (UE), an indication indicating a first set of parameters determined by the UE for configuring a first set of monitoring occasions to monitor control channel candidates in a common search space (CSS).

In an additional aspect of the disclosure, a first wireless communications device comprises means for determining a first set of parameters for configuring a first set of monitoring occasions for the UE to monitor control channel candidates in a common search space (CSS); means for transmitting, to a network entity, an indication indicating the first set of parameters; and means for monitoring control channel candidates in the CSS during the first set of monitoring occasions.

In an additional aspect of the disclosure, a first wireless communications device comprises means for receiving, from a user equipment (UE), an indication indicating a first set of parameters determined by the UE for configuring a first set of monitoring occasions to monitor control channel candidates in a common search space (CSS).

In an additional aspect of the disclosure, a computer program comprising instructions, which, when the program is executed by a computer, cause the computer to carry out one of the methods performed by a UE or a network entity described herein.

Other aspects, features, and aspects will become apparent to those of ordinary skill in the art, upon reviewing the following description of specific, exemplary aspects in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects it should be

BRIEF DESCRIPTION OF THE DRAWINGS

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
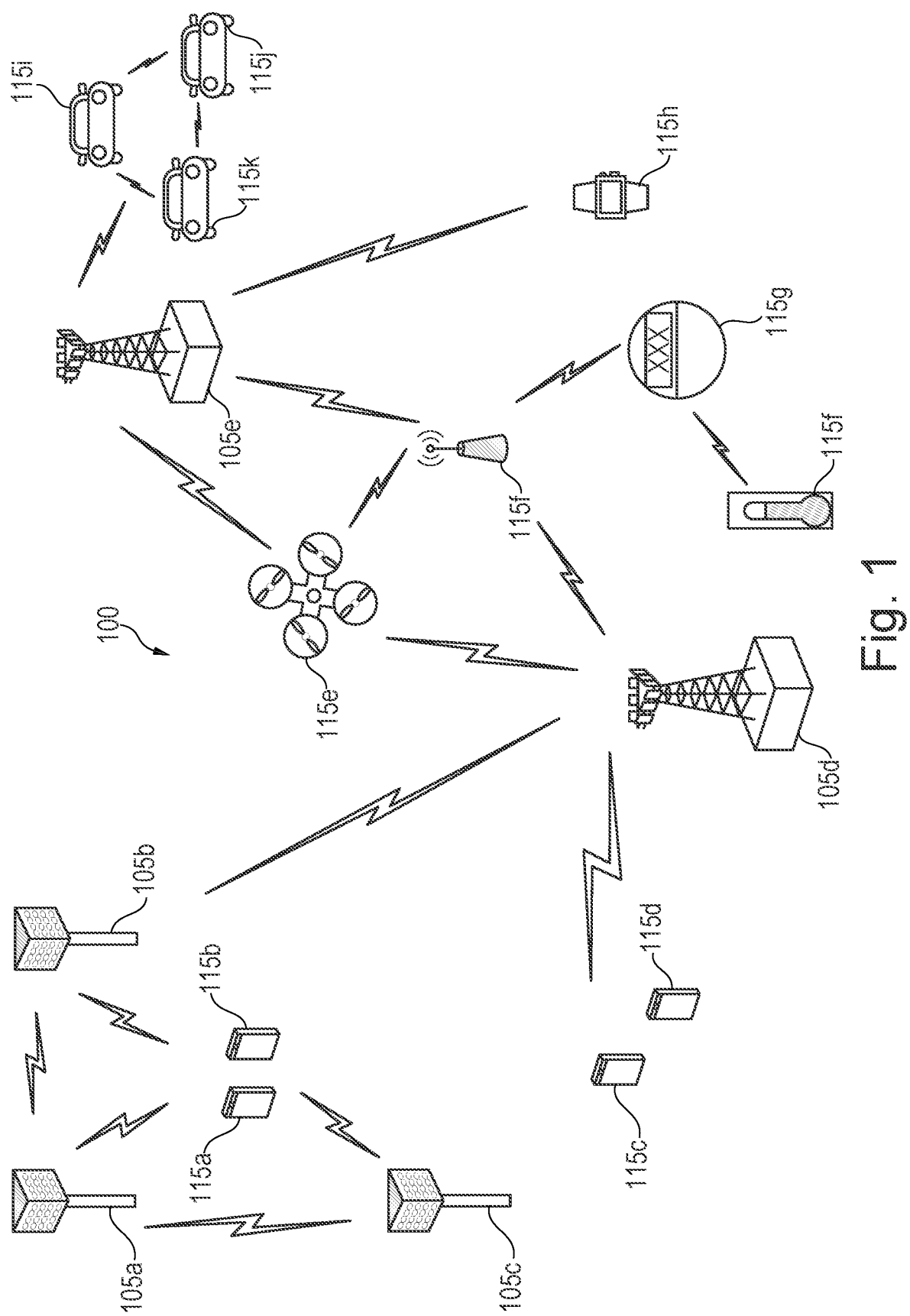
FIG. 1 illustrates an example of a wireless communication network according to some aspects.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Downlink control signaling is used for multiple purposes and the number of bits required may vary depending on the usage of the control message. In an aspect, a downlink control information (DCI) message is therefore characterized by two aspects: DCI size and DCI type. The size and type are a priori unknown to a device (e.g. a UE), which therefore needs to blindly decode a control channel candidate. The control channel can e.g. be a Physical Downlink Control Channel (PDCCH). By attempting to decode using different hypotheses, the device can detect valid control information, if any.

A control resource set (CORESET) is a time-frequency resource in which the device tries to decode the candidate control channels. The size and location of a CORESET in the time-frequency domain may e.g. be semi-statically configured by a network entity (e.g. a base station, BS) and can thus be set to be smaller than a carrier bandwidth. This is especially important in NR as a carrier can be very wide, up to 400 MHz.

A search space is a set of candidate control channels at a given aggregation level, which the device is supposed to attempt to decode. Five different aggregation levels corresponding to 1, 2, 4, 8, and 16 control channel elements (CCEs), respectively, may be configured. As there are multiple aggregation levels, a device can have multiple search spaces. A search space set is a set of search spaces with different aggregation levels linked to the same CORESET. Thus, by configuring a CORESET and a search space set, the device can monitor the presence of control channels with different aggregation levels but using the same time-frequency resource.

At a configured monitoring occasion for a search space or a search space set, the device may attempt to decode candidate control channels in the search space or the search space set.

In an aspect, there are two types of search spaces: common search space (CSS) and device-specific search space, also known as a UE-specific search space (USS). CSS may carry signals and/or messages intended for a group of UEs. USS is dedicated for each specific UE. A UE may be required to monitor both common and UE-specific search spaces. There might be overlap between common and UE-specific search spaces for a UE. In case of overlap, the UE may prioritize the CSS over the USS.

Different types of common search space (CSS) may be defined. For example, in 5G/NR, a CSS can be a Type0, Type0A, Type1, Type2, or Type3 CSS. In case of beamformed communication, a monitoring occasion of a CSS may be associated with a synchronization signal block (SSB). Control channels in a CSS may be repeated on multiple monitoring occasions associated with different SSBs. Based on a SSB measurement (e.g., Reference Signal Received Power (RSRP) measurement), the network entity or the UE can determine one or more monitoring occasions to use for the CSS. For example, monitoring occasions associated with SSB(s) that have high measured RSRP may be configured for CSS monitoring.

In an example, for System Information Block (SIB) decoding, in case for a SIB1 message, the UE may monitor Type0CSS in two slots associated with an SSB. The two slots may be consecutive for a subcarrier spacing (SCS) that is smaller than or equal to 120 kHz and non-consecutive for SCS that is bigger than 120 kHz (e.g., 480 kHz, 960 kHz, etc.). In case for another SIB message (other than the SIB1 message), when the Type0A CSS is set to zero, the UE may monitor the same search space/search space set as configured for the Type0CSS in a system information (SI) window. Otherwise, the UE may monitor a search space/search space set as configured for the Type0A CSS in a SI window.

In another example, for Message 2 (Msg2), Message 4 (Msg4) or Message B (MsgB) decoding (e.g. in a random access procedure), the UE may monitor a search space/search space set configured for Type1 CSS in a Random Access Response (RAR) window.

In another example, for paging decoding, when the Type2 CSS is set to zero, the UE may monitor the same search space/search space set as configured for Type0CSS in a paging occasion (PO). Otherwise, the UE may monitor a search space/search space set configured for Type2 CSS in a PO.

As size and type of DCI are a priori unknown to a device, as explained earlier, a UE has a monitoring capability or blind decoding (BD) capability. However, this blind decoding capability typically has certain limitations. For example, there is a maximal number of control channel candidates a UE can blindly decode per certain time period (e.g. a slot, a span, or a group of consecutive slots). In other words, a UE is bound with a maximal number of attempts of blind decoding per certain time period. A budget is used by the network entity to control the number of control channel candidates to be monitored by the UE. The budget is also called a BD budget, a control channel element (CCE) budget, or BD/CCE budget.

The BD budget for a CSS may be pre-determined. Different types of CSS may have different BD budgets. In some cases, control channel overbooking may be applied. For example, for a given BD budget for a serving cell, the BD budget is first assigned to the CSS sets, and the remainder is assigned to the USS sets. Further, the number of configured control channel candidates for the USS sets can be larger than the BD budgets. In such a case, the USS sets with the highest indices are dropped one by one until the remaining USS sets can fit the BD budgets.

Monitoring occasions are configured by the network entity. The network entity may transmit an indication of pre-determined monitoring occasions to the UE. In some cases, the network entity may indicate only a subset of the pre-determined monitoring occasions to the UE. For example, in beamformed communications, monitoring occasions are associated with different SSBs. The network entity may configure the UE to use only a subset of monitoring occasions based on RSRP measurements (e.g., monitoring occasions associated with SSB(s) that have high measured RSRP may be configured for the UE). In this case, a BD budget is only counted for the monitoring occasions in the subset of monitoring occasions.

For a CSS, no matter whether the network entity configures the UE with a set of pre-determined monitoring occasions or only a subset thereof, the UE may not need to monitor all the monitoring occasions indicated/configured by the network entity.

In one example, for Type0/0A CSS, the network entity may indicate the UE, a System Information (SI) change and/or a Public Warning System (PWS) notification with a Short Message transmission. Once indicated, the UE monitors Type0/0A CSS during the next "modification period" to receive updated SI messages.

In another example, after transmitting a Random Access (RA) preamble for SI request, the UE monitors Type0A CSS during the next "SI window".

In another example, after transmitting a Random Access (RA) preamble (or MessageA (MsgA), the UE monitors Type1 CSS during the next "RAR window".

In another example, the UE monitors Type2 CSS in any paging occasion (PO) at least once per modification period or per default paging cycle.

However, the network entity may not know when the UE will actually monitor the CSS and which monitoring occasions will be monitored by the UE. As a result, the BD budget is always assigned to the monitoring occasions configured by the network entity. When the UE does not actually monitor all the CSS monitoring occasions indicated/configured by the network entity, some of the BD budget will be wasted. Further, in the case when the BD budget assignment to CSS monitoring occasions is prioritized over USS monitoring occasions, the opportunity for control channel transmission in USS monitoring occasions will be restricted.

The present disclosure provides techniques for the UE to send an indication to the network entity indicating monitoring occasions that will be actually monitored by the UE. The indication may indicate a set of parameters comprising one or more parameters which are used by the UE to configure a first set of monitoring occasions for the UE to monitor control channel candidates in a CSS. The network entity may use this indication to determine the CSS monitoring occasions actually-monitored by the UE. The network entity and/or the UE may assume that the BD budget is only assigned to the CSS monitoring occasions indicated by the indication. The BD budget for other CSS monitoring occasions may then be re-assigned to USS monitoring occasions. The techniques disclosed herein may increase opportunity for control channel transmission in USS monitoring occasions and thus improve unicast communication with the UE. Further, the techniques disclosed herein may improve scheduling flexibility.

FIG. 1 illustrates an example of a wireless communications network 100 according to some aspects of the present disclosure. The network 100 includes a number of network entities 105 (individually labeled as 105a, 105b, 105c, 105d, 105e, and 105O and other network entities. A network entity 105 may be a base station (BS) that communicates with UEs 115 and may also be referred to as an evolved node B (eNB), a next generation eNB (gNB), an access point, and the like. Each network entity 105 may provide communication coverage for a particular geographic area. In 3GPP, the term "cell" can refer to this particular geographic coverage area of a network entity 105 and/or a network entity subsystem serving the coverage area, depending on the context in which the term is used.

A network entity 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A network entity for a macro cell may be referred to as a macro BS. A network entity for a small cell may be referred to as a small cell BS, a pico BS, a femto BS or a home BS. In the example shown in FIG. 1, the network entities 105d and 105e may be regular macro BSs, while the network entities 105a-105c may be macro BSs enabled with one of three dimension (3D), full dimension (FD), or massive MIMO. The network entities 105a-105c may take advantage of their higher dimension MIMO capabilities to exploit 3D beamforming in both elevation and azimuth beamforming to increase coverage and capacity. The network entity 105f may be a small cell BS which may be a home node or portable access point. A network entity 105 may support one or multiple (e.g., two, three, four, and the like) cells.

The UEs 115 are dispersed throughout the network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. In FIG. 1, a lightning bolt (e.g., communication links) indicates wireless transmissions between a UE 115 and a serving network entity 105, which is a network entity designated to serve the UE 115 on the downlink and/or uplink, or desired transmission between network entities, and backhaul transmissions between network entities.

In operation, the network entities 105a-105c may serve the UEs 115a and 115b using 3D beamforming and coordinated spatial techniques, such as coordinated multipoint (CoMP) or multi-connectivity. The macro BS 105d may perform backhaul communications with the network entities 105a-105c, as well as small cell, the network entity 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The network entities 105 may also communicate with a core network. The core network may provide user authentication, access authorization, tracking, Internet Protocol (IP) connectivity, and other access, routing, or mobility functions. At least some of the network entities 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the network entities 105 may communicate, either directly or indirectly (e.g., through core network), with each other over backhaul links (e.g., XI, X2, etc.), which may be wired or wireless communication links.

In some aspects, the network entities 105 can assign or schedule transmission resources (e.g., in the form of time-frequency resource blocks (RB)) for downlink (DL) and uplink (UL) transmissions in the network 100. DL refers to the transmission direction from a network entity 105 to a UE 115, whereas UL refers to the transmission direction from a UE 115 to a network entity 105. As noted above, the communication can be in the form of radio frames, which will be explained in greater details with reference to FIGS. 2A-2D.

Although the following description may be focused on NR, the concepts described herein may be applicable to other similar areas, such as LTE, LTE-A, CDMA, GSM, and other wireless technologies.

Figure 2:
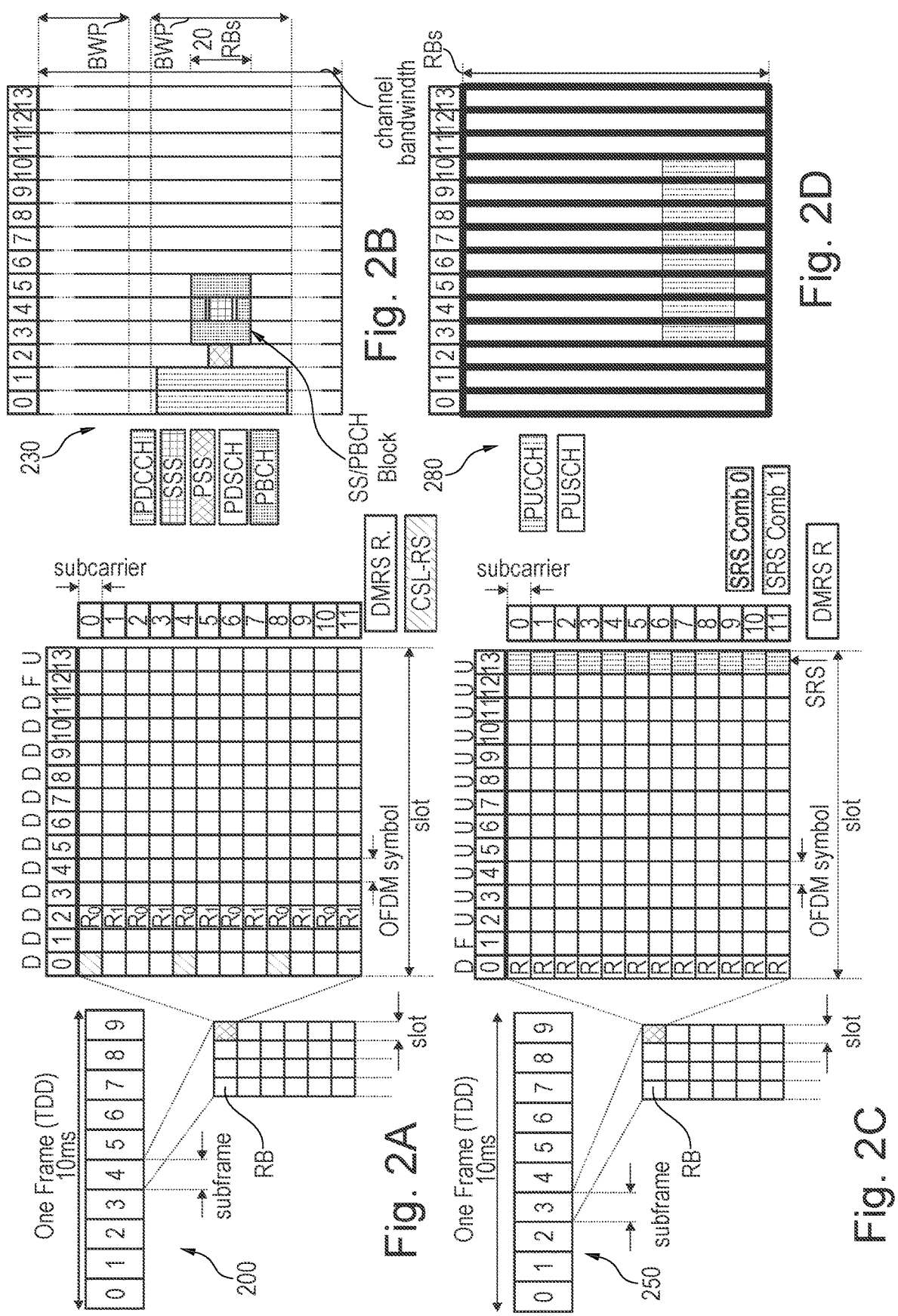
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively according to some aspects.

FIG. 2A is a diagram 200 illustrating an example of a first subframe within a NR frame structure. FIG. 2B is a diagram 230 illustrating an example of DL channels within a NR subframe. FIG. 2C is a diagram 250 illustrating an example of a second subframe within a NR frame structure. FIG. 2D is a diagram 280 illustrating an example of UL channels within a NR subframe. The NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on whether the cyclic prefix (CP) is normal or extended. For normal CP, each slot may include 14 symbols, and for extended CP, each slot may include 7 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. The UE 115 may perform blind decoding in the search spaces to search for DL control information from the network entity. In an example, the network entity 105 may configure the UE 115 with the BWPs, the CORESETS, and/or the PDCCH search spaces via RRC configurations.

Additional BWPs may be located at greater and/or lower frequencies across the channel bandwidth. A primary synchronization signal (PSS) may be within symbol 2 of particular subframes of a frame. The PSS is used by a UE 115 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

After obtaining the MIB, an RMSI and/or an OSI, the UE 115 can perform a random access procedure to establish a connection with the network entity 105. For the random access procedure, the UE 115 may transmit a random access preamble and the network entity 105 may respond with a random access response. Upon receiving the random access response, the UE 115 may transmit a connection request to the network entity 105 and the network entity 105 may respond with a connection response (e.g., contention resolution message).

After establishing a connection, the UE 115 and the network entity 105 can enter a normal operation stage, where operational data may be exchanged. For example, the network entity 105 may schedule the UE 115 for UL and/or DL communications. The network entity 105 may transmit UL and/or DL scheduling grants to the UE 115 via a PDCCH. The network entity 105 may transmit a DL communication signal to the UE 115 via a PDSCH according to a DL scheduling grant. The UE 115 may transmit a UL communication signal to the network entity 105 via a PUSCH and/or PUCCH according to a UL scheduling grant.

As illustrated in FIG. 2C, some of the REs carry DM-RS (indicated as R for one particular configuration, but other DM-RS configurations are possible) for channel estimation at the network entity. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by the network entity for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
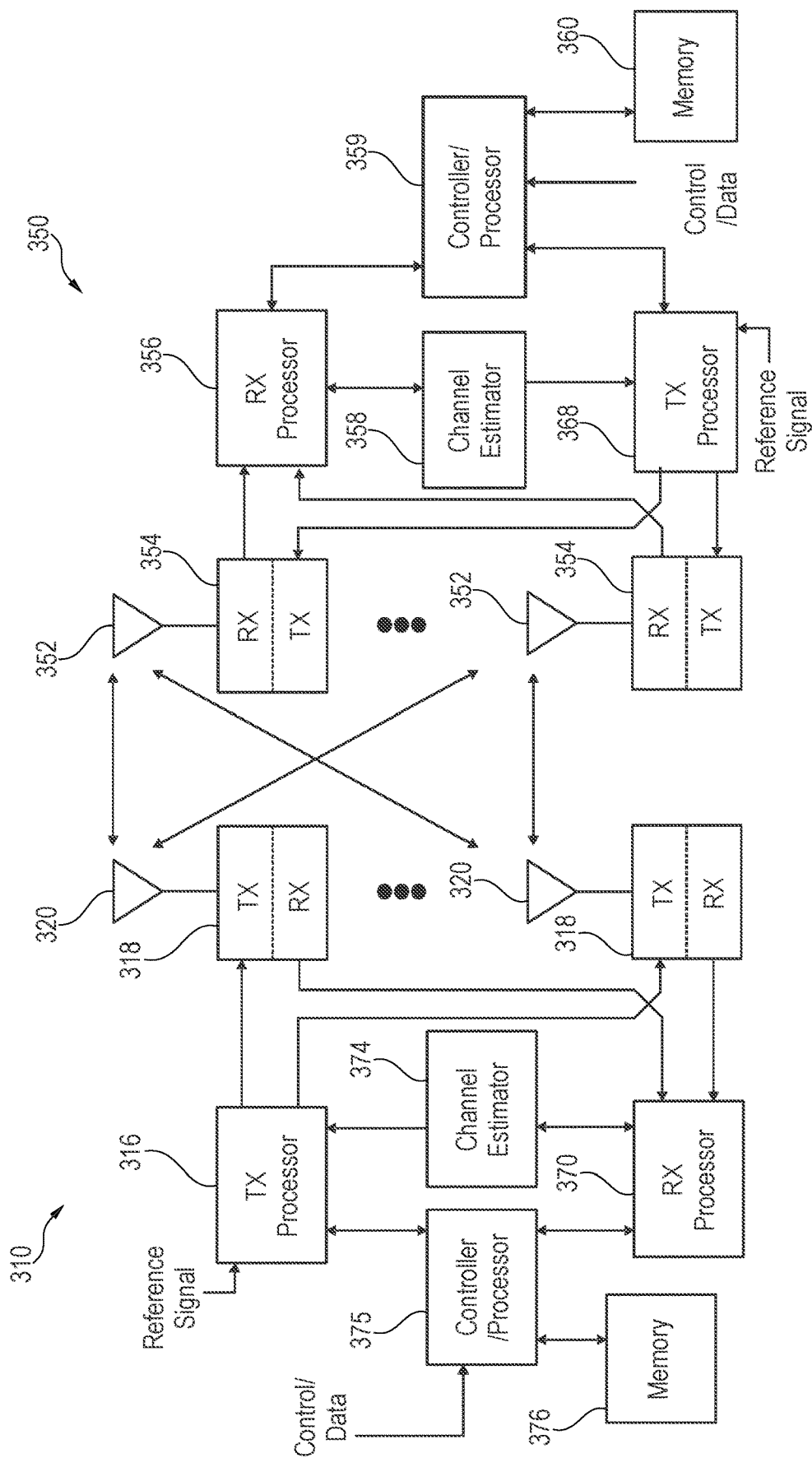
FIG. 3 is a diagram illustrating an example of a network entity and user equipment (UE) according to some aspects.

FIG. 3 is a block diagram of a network entity 310 (e.g. network entity 105 in the network 100 as discussed above in FIG. 1) in communication with a UE 350 (e.g. UE 115 in the network 100 as discussed above in FIG. 1) in an access network.

In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the network entity 310. These soft decisions may be based on channel estimates computed by the channel estimator 358. The soft decisions are then decoded and deinterleaved to recover the data and control signals that were originally transmitted by the network entity 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the network entity 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the network entity 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the network entity 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
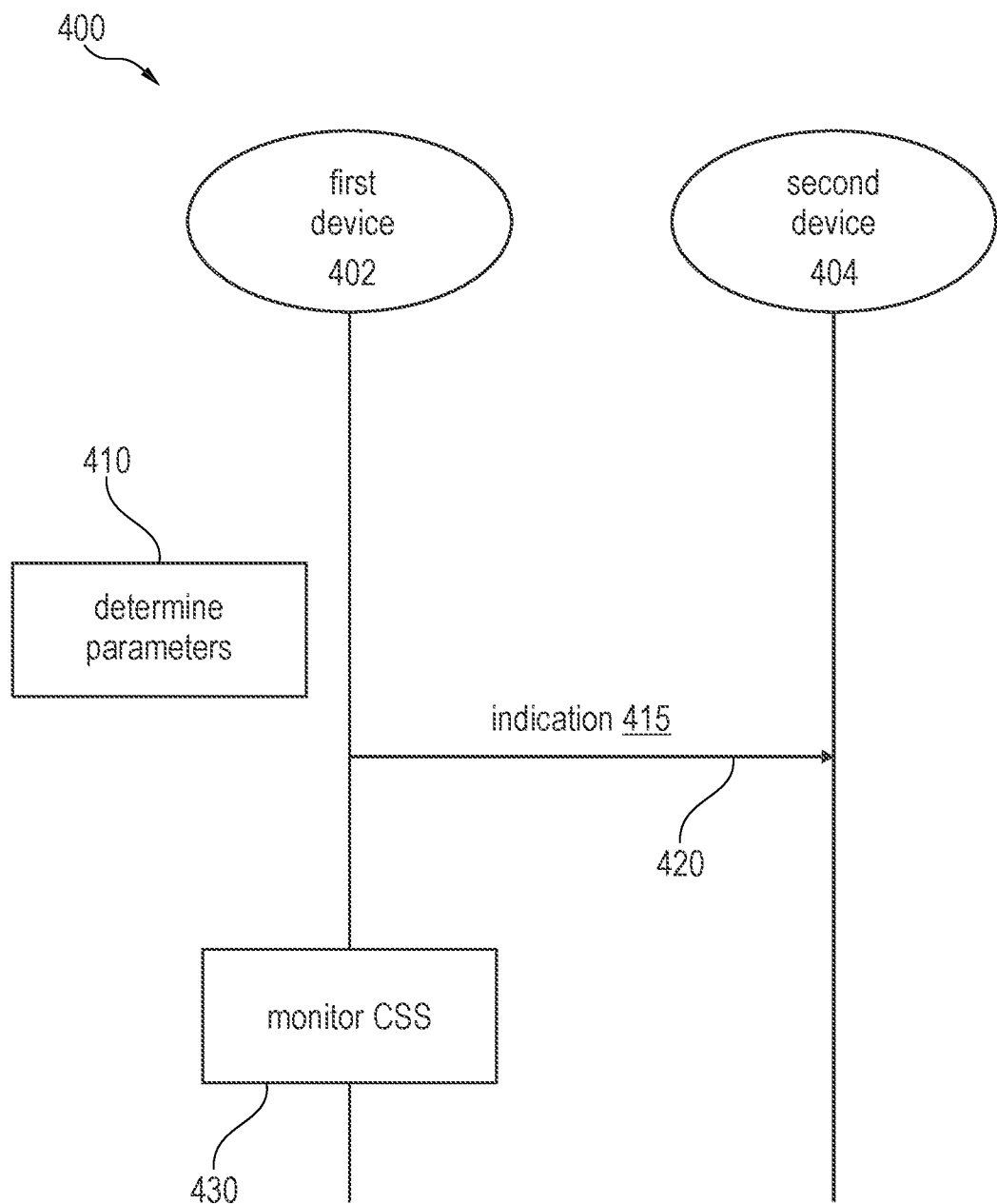
FIG. 4 illustrates a signaling diagram of a scheme for transmitting an indication according to some aspects.

FIG. 4 is a signaling diagram illustrating a communication method 400 for transmitting an indication according to some aspects. The method 400 may be implemented between a network entity (e.g., network entity 105 or network entity 310) and a UE (e.g., the UE 115 or UE 350). In the illustration of FIG. 4, the first device 402 may be an example of the UE 350 and the second device 404 may be an example of the network entity 310.

The method 400 may employ similar mechanisms as in the methods 800, 900, 1000 or 1100 described herein with respect to FIGS. 8-11, respectively. Steps of the method 400 can be executed by computing devices (e.g., a processor, processing circuit, and/or other suitable component) of the network entity 310 and the UE 350. In an example, the network entity 310 may utilize one or more components, such as the processor 316, 375 and/or 370, the memory 376, the transmitter/receiver 318, and the one or more antennas 320, to execute the steps of method 400. The UE 350 may utilize one or more components, such as the processor 356, 359 and/or 368, the memory 360, the transmitter/receiver 354, and the one or more antennas 352, to execute the steps of method 400. As illustrated, the method 400 includes a number of enumerated steps, but aspects of the method 400 may include additional steps before, after, and in between the enumerated steps.

At action 410, the first device 402 determines a first set of parameters for configuring a first set of monitoring occasions for the UE to monitor control channel candidates in a common search space (CSS).

At action 420, the first device 402 transmits an indication 415 to the second device 404. The indication 415 indicates the first set of parameters.

At action 430, the first device 402 monitors control channel candidates in the CSS during the first set of monitoring occasions.

In an aspect, the first device 402 may receive from the second device 404, configuration information comprising a second set of parameters for configuring a second set of monitoring occasions for the CSS. The second set of parameters may be common for a group of UEs served by the second device 404.

In an aspect, the first set of monitoring occasions may be a subset of the second set of monitoring occasions. For example, the first set of parameters may be determined based on the second set of parameters to select a subset of monitoring occasions from the second set of monitoring occasions.

In an example implementation (such as an example illustrated in FIG. 5), the second set of parameters may comprise a periodicity P1 (e.g., the periodicity is defined as 20 ms). The first set of parameters may comprise a parameter K1 (wherein K1 is an integer equal to or greater than 2), so that the periodicity of the first set of monitoring occasions will be K1·P1 (e.g., K1·20 ms).

In another example implementation, the second set of parameters may comprise one or more parameters to define a modification period (e.g., the modification period is defined as {2, 4, 8, 16}×defaultPagingCycle). The first set of parameters may comprise a parameter to configure that the first device 402 will monitor control channel candidates in the monitoring occasions during only a first half of the modification period.

In another example implementation, the second set of parameters may comprise one or more parameters to define a System Information (SI) window (e.g., the SI window is defined as {5, 10, 20, 40, 80, 160, 320, 640, 1280} slots). The first set of parameters may comprise a parameter to configure that the first device 402 will monitor control channel candidates in the monitoring occasions during only a first half of the SI window.

In an example implementation (such as an example illustrated in FIG. 6), the second set of parameters may comprise one or more parameters to define a Random Access Response (RAR) window (e.g., the RAR window is defined as 11, 2, 4, 8, 10, 20, 40, 801 slots). The first set of parameters may comprise a parameter to configure that the first device 402 will monitor control channel candidates in the monitoring occasions during only a first half of the RAR window.

In another example implementation, a Paging Occasion (PO) may have a fixed periodicity and offset. The second set of parameters may comprise one or more parameters to configure that control channel candidates are monitored in the monitoring occasions at one PO per default paging cycle. The first set of parameters may comprise a parameter K2 (wherein K2 is an integer equal to or greater than 2), so that the first device 402 will monitor control channel candidates in the monitoring occasions at one PO per K2 default paging cycles.

In another example implementation, the second set of parameters may comprise index numbers indicating the second set of monitoring occasions. The first set of parameters may comprise a subset of the index numbers (e.g., only even/odd index numbers), so that the first device 402 will monitor control channel candidates in the monitoring occasions associated with the subset of index numbers.

In an aspect, transmitting the indication may comprise transmitting the indication in a connected mode of the first device 402.

In an aspect, the indication may indicate a specific type of CSS (e.g., a Type0CSS, a Type0A CSS, a Type1 CSS, a Type2 CSS, etc.) associated with the first set of parameters.

In an aspect, the indication may indicate a specific type of message and/or specific type of procedure associated with the first set of parameters. For example, the indication may indicate a specific type of SIB message (e.g., SIB1, SIB2, SIB3, etc.). In another example, the indication may indicate a specific type of random access procedure (e.g., a 2-step random access procedure, a 4-step random access procedure, etc.). In another example, the indication may indicate a specific type of notification (e.g., as a System Information (SI) change notification, a Public Warning System (PWS) notification, etc.).

In an aspect, the first set of parameters may comprise one or more of: a monitoring periodicity, a monitoring offset, a modification period, and a prioritization among CSS and UE-specific search space (USS) monitoring occasions.

In an aspect, transmitting the indication may comprise transmitting the indication via a Physical Uplink Control Channel (PUCCH), a Physical Random Access Channel (PRACH), or a Medium Access Control (MAC) Control Element (CE).

In an aspect, the indication 415 may be on demand. For example, the first device 402 may receive from the second device 404, a request to transmit the indication, prior to transmitting the indication 415.

In an aspect, a Blind Decoding (BD) budget for the UE may be assigned only to the first set of monitoring occasions. In the case that the first set of monitoring occasions is a subset of the second monitoring occasions, for other CSS monitoring occasions (not included in the first set of monitoring occasions), the BD budget may be re-assigned to USS monitoring occasions in the same slot/span/slot-group to improve scheduling flexibility.

Figure 7:
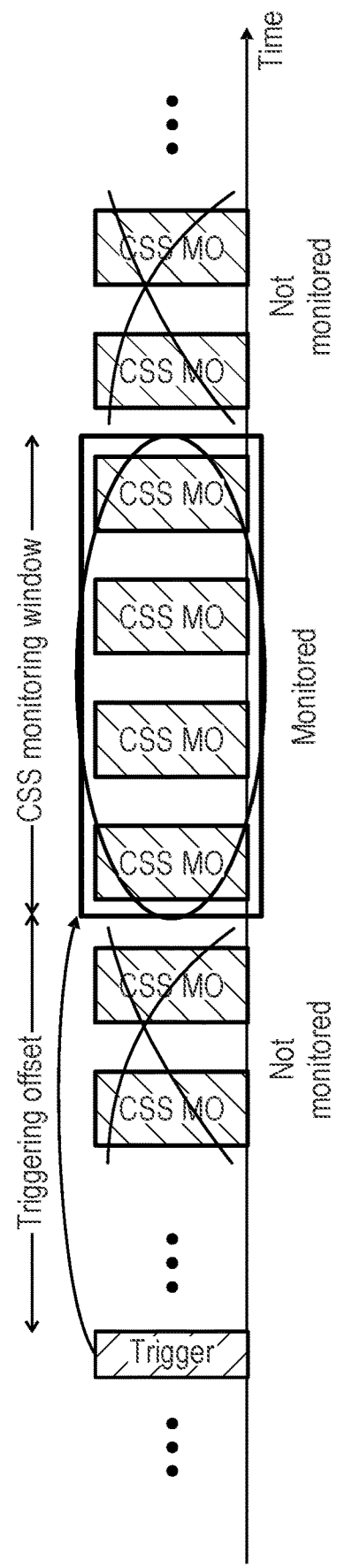
FIG. 7 illustrates an example implementation for indicating a CSS monitoring window according to some aspects.

In an aspect, the indication 415 may indicate a CSS monitoring window (e.g., as illustrated in an example implementation shown in FIG. 7). Further, the indication may indicate a length of the CSS monitoring window. In an example implementation, the length of the CSS monitoring window may be the same as a length of the SI window. In another example implementation, the length of the CSS monitoring window may be the same as a length of the RAR window.

In an aspect, the indication 415 may be a trigger of the CSS monitoring window. In this case, the CSS monitoring window will only start after the first device 402 transmits the indication 415. Further, the CSS monitoring window may start after some application delay/triggering offset (i.e., a pre-determined amount of time) from transmitting the indication 415. In an example implementation, the first device 402 monitors control channel candidates in every slot in the CSS monitoring window. In another example implementation, the first device 402 monitors control channel candidates, in the CSS monitoring window, in monitoring occasions as configured by the second set of parameters.

In an aspect, the indication 415 may be an explicit indication or an implicit indication (e.g., by association with a resource used to transmit the indication).

Figure 5:
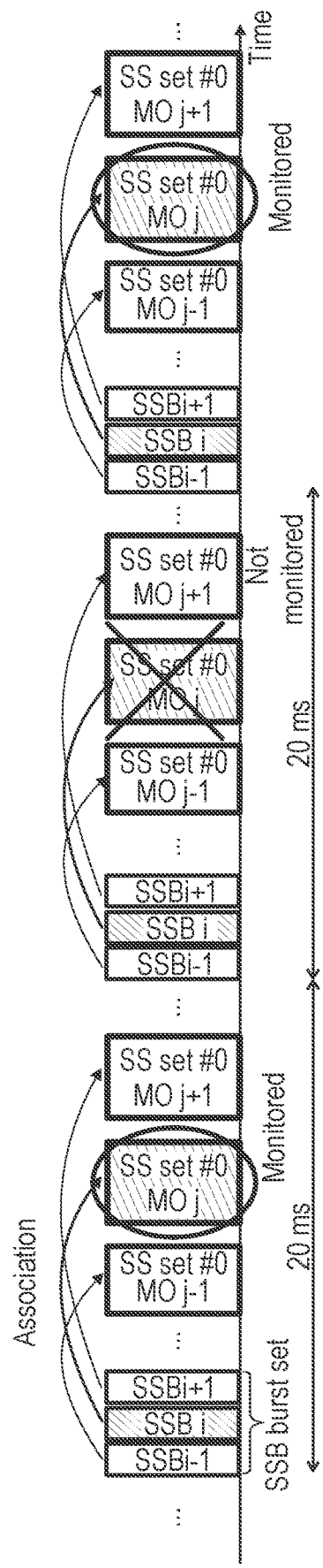
FIG. 5 illustrates a first example implementation for selecting a subset of monitoring occasions according to some aspects.

FIG. 5 illustrates a first example implementation for selecting a subset of monitoring occasions according to some aspects.

As illustrated, in a search space set (e.g., search space set #0), each search monitoring occasion is associated with a specific SSB. For example, monitoring occasions j−1, j, and j+1 are associated with SSB i−1, i, and i+1, respectively. Further as illustrated, the monitoring occasions in the search space set have been configured to repeat every 20 ms.

Initially, the network entity may configure the UE to monitor search space set #0 only in monitoring occasions j (associated with SSB i) at the pre-determined periodicity of 20 ms (e.g., based on RSRP measurements).

By implementing the techniques disclosed herein, the UE may determine a different periodicity for monitoring the search space set. As illustrated, the UE monitors every 40 ms instead of every 20 ms. Moreover, the UE can also monitor every 60 ms, 80 ms, etc. By using a different periodicity, the UE will monitor only a subset of the monitoring occasions as initially configured by the network entity.

Figure 6:
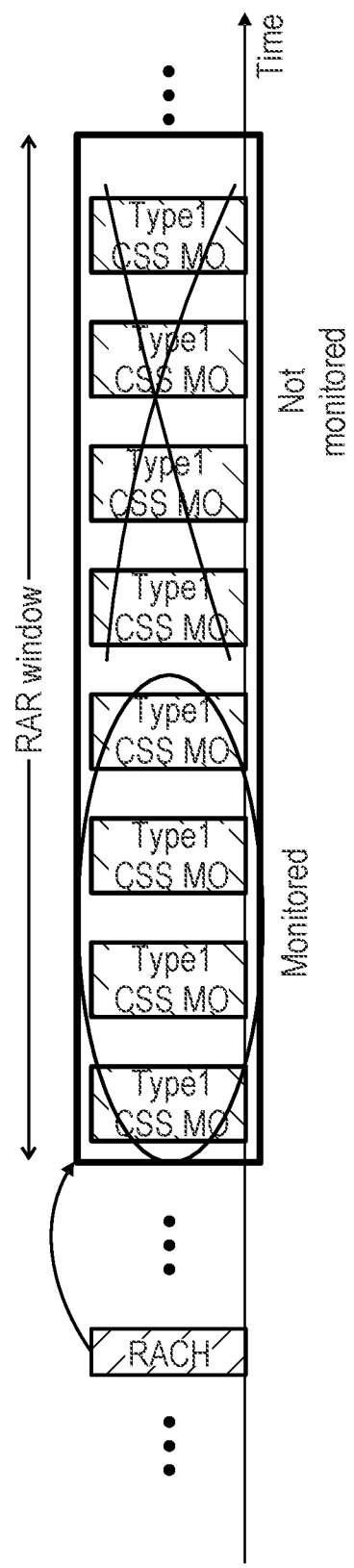
FIG. 6 illustrates a second example implementation for selecting a subset of monitoring occasions according to some aspects.

FIG. 6 illustrates a second example implementation for selecting a subset of monitoring occasions according to some aspects.

As illustrated, in a random access procedure, the network entity may initially configure a first number of Type1 CSS monitoring occasions in a random access response (RAR) window. For example, in illustration shown, the first number may be eight.

By implementing the techniques disclosed herein, the UE may determine a smaller window size for monitoring the CSS. In particular, the UE may determine a second number of monitoring occasions, with the second number being smaller than the first number. As illustrated, in one example, the UE monitors only half of the RAR window (e.g., four monitoring occasions). Moreover, the UE can also monitor ¼ or ⅛ of the RAR window, etc. By using a different window size, the UE will monitor only a subset of the monitoring occasions as initially configured by the network entity.

FIG. 7 illustrates an example implementation for indicating a CSS monitoring window according to some aspects.

As illustrated, the UE may determine a CSS monitoring window for monitoring the CSS. The UE monitors only the monitoring occasions within the determined CSS monitoring window. The UE sends an indication of the CSS monitoring window to the network entity.

Further, the indication can be implemented as a trigger of the CSS monitoring window. The CSS monitoring window starts only after the UE has transmitted the indication to the network entity.

Moreover, the UE can configure a triggering offset, so that the CSS monitoring window only starts after a triggering offset amount of time after the UE has transmitted the indication to the network entity.

Further, the indication may indicate a length of the CSS monitoring window. In an example implementation, the length of the CSS monitoring window may be the same as a length of an SI window. In another example implementation, the length of the CSS monitoring window may be the same as a length of an RAR window.

In an example, the UE monitors control channel candidates in every slot in the CSS monitoring window. In another example, the UE monitors control channel candidates, in the CSS monitoring window, in monitoring occasions as configured by the network entity.

In an example, the indication may be an explicit indication or an implicit indication (e.g., by association with a resource used to transmit the indication).

Figure 8:
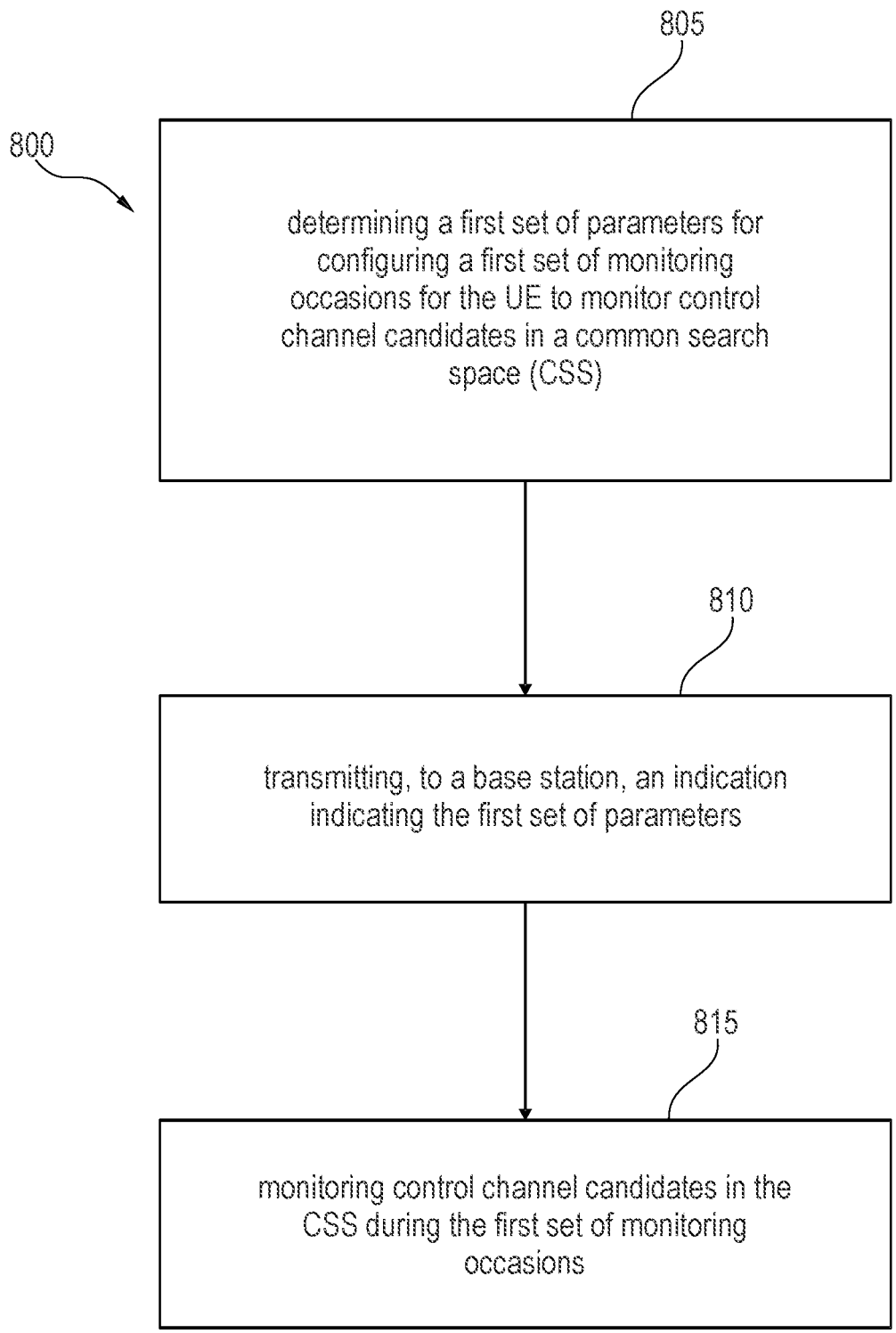
FIG. 8 illustrates a flow diagram of a wireless communication method according to some aspects.

FIG. 8 is a flow diagram of a communication method 800 according to some aspects of the present disclosure. Steps of the method 800 can be executed by a computing device (e.g., a processor, processing circuit, and/or other suitable component) of a wireless communication device or other suitable means for performing the steps. For example, a wireless communication device, such as the UE 115 or UE 350, and may utilize one or more components to execute the steps of method 800. The method 800 may employ similar mechanisms as in the structure described above with respect to FIG. 3 and/or the scheme 400 described with respect to FIG. 4. As illustrated, the method 800 includes a number of enumerated steps, but aspects of the method 800 may include additional steps before, after, and in between the enumerated steps.

At block 810, a UE 115/350 determines a first set of parameters for configuring a first set of monitoring occasions for the UE to monitor control channel candidates in a common search space (CSS).

At block 815, the UE 115/350 transmits, to a network entity, an indication indicating the first set of parameters.

At block 820, the UE 115/350 monitors control channel candidates in the CSS during the first set of monitoring occasions.

Figure 9:
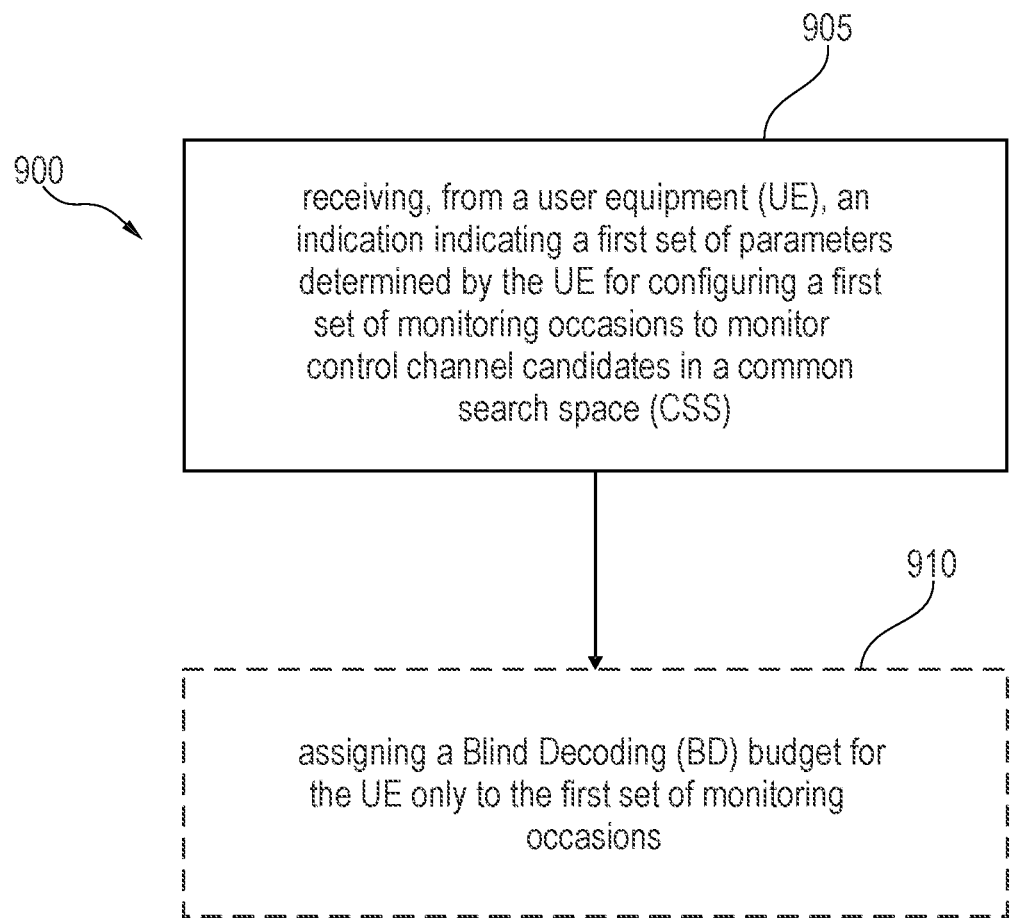
FIG. 9 illustrates a flow diagram of a wireless communication method according to some aspects.

FIG. 9 is a flow diagram of a communication method 900 according to some aspects of the present disclosure. Steps of the method 900 can be executed by a computing device (e.g., a processor, processing circuit, and/or other suitable component) of a wireless communication device or other suitable means for performing the steps. For example, a wireless communication device, such as the network entity 105 or the network entity 310, and may utilize one or more components to execute the steps of method 900. The method 900 may employ similar mechanisms as in the structure described above with respect to FIG. 3 and/or the scheme 400 described with respect to FIG. 4. As illustrated, the method 900 includes a number of enumerated steps, but aspects of the method 900 may include additional steps before, after, and in between the enumerated steps.

At block 905, a network entity receives, from a user equipment (UE), an indication indicating a first set of parameters determined by the UE for configuring a first set of monitoring occasions to monitor control channel candidates in a common search space (CSS).

At block 910, as an optional step, the network entity assigns a Blind Decoding (BD) budget for the UE only to the first set of monitoring occasions.

Figure 10:
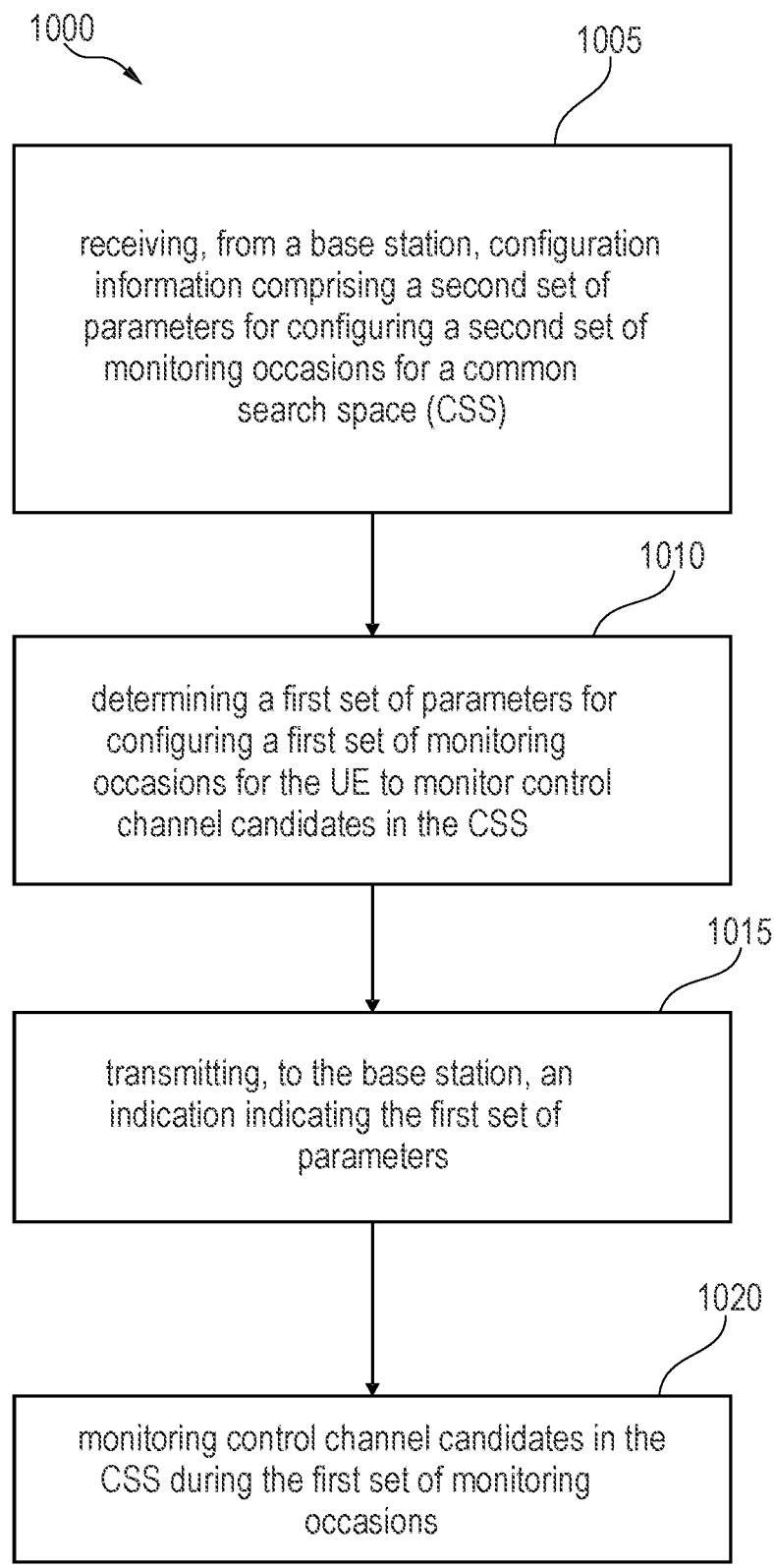
FIG. 10 illustrates a flow diagram of a wireless communication method according to some aspects.

FIG. 10 is a flow diagram of a communication method 1000 according to some aspects of the present disclosure. Steps of the method 1000 can be executed by a computing device (e.g., a processor, processing circuit, and/or other suitable component) of a wireless communication device or other suitable means for performing the steps. For example, a wireless communication device, such as the UE 115 or UE 350, and may utilize one or more components to execute the steps of method 1000. The method 1000 may employ similar mechanisms as in the structure described above with respect to FIG. 3 and/or the scheme 400 described with respect to FIG. 4. As illustrated, the method 1000 includes a number of enumerated steps, but aspects of the method 1000 may include additional steps before, after, and in between the enumerated steps.

At block 1005, a UE 115/350 receives, from a network entity, configuration information comprising a second set of parameters for configuring a second set of monitoring occasions for a common search space (CSS). The second set of parameters may be common for a group of UEs served by the network entity.

At block 1010, the UE 115/350 determines a first set of parameters for configuring a first set of monitoring occasions for the UE to monitor control channel candidates in the CSS. In an aspect, the first set of monitoring occasions may be a subset from the second set of monitoring occasions.

At block 1015, the UE 115/350 transmits, to the network entity, an indication indicating the first set of parameters.

At block 1020, the UE 115/350 monitors control channel candidates in the CSS during the first set of monitoring occasions.

Figure 11:
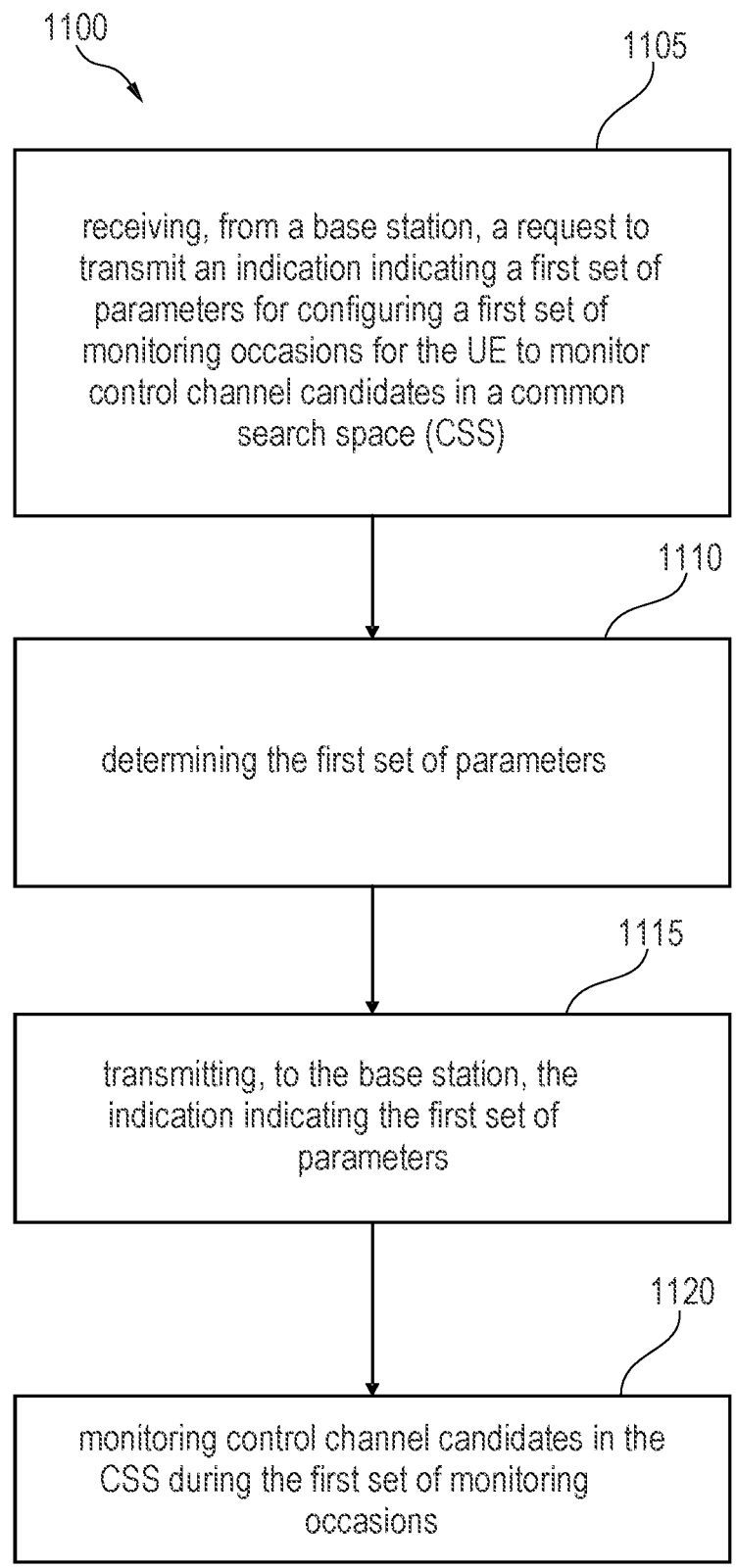
FIG. 11 illustrates a flow diagram of a wireless communication method according to some aspects.

FIG. 11 is a flow diagram of a communication method 1100 according to some aspects of the present disclosure. Steps of the method 1100 can be executed by a computing device (e.g., a processor, processing circuit, and/or other suitable component) of a wireless communication device or other suitable means for performing the steps. For example, a wireless communication device, such as the UE 115 or UE 350, and may utilize one or more components to execute the steps of method 1100. The method 1100 may employ similar mechanisms as in the structure described above with respect to FIG. 3 and/or the scheme 400 described with respect to FIG. 4. As illustrated, the method 1100 includes a number of enumerated steps, but aspects of the method 1100 may include additional steps before, after, and in between the enumerated steps.

At block 1105, a UE 115/350 receives, from a network entity, a request to transmit an indication indicating a first set of parameters for configuring a first set of monitoring occasions for the UE to monitor control channel candidates in a common search space (CSS).

At block 1110, the UE 115/350 determines the first set of parameters for configuring the first set of monitoring occasions for the UE to monitor control channel candidates in the CSS.

At block 1115, the UE 115/350 transmits, to the network entity, an indication indicating the first set of parameters.

At block 1120, the UE 115/350 monitors control channel candidates in the CSS during the first set of monitoring occasions.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

Further aspects of the present disclosure include the following:

1. A method of wireless communication at a user equipment (UE), comprising:
    determining a first set of parameters for configuring a first set of monitoring occasions for the UE to monitor control channel candidates in a common search space (CSS);
    transmitting, to a network entity, an indication indicating the first set of parameters; and
    monitoring control channel candidates in the CSS during the first set of monitoring occasions.

2. The method of aspect 1, further comprising:
    receiving, from the network entity, configuration information comprising a second set of parameters for configuring a second set of monitoring occasions for the CSS, wherein the second set of parameters is common for a group of UEs served by the network entity.

3. The method of aspect 2, wherein the first set of monitoring occasions is a subset of the second set of monitoring occasions.

4. The method of any preceding aspects, wherein transmitting the indication comprises transmitting the indication in a connected mode of the UE.

5. The method of any preceding aspects, wherein the indication indicates a specific type of CSS associated with the first set of parameters.

6. The method of any preceding aspect, wherein the indication indicates a specific type of message and/or specific type of procedure associated with the first set of parameters.

7. The method of aspect 6, wherein the specific type of message comprises one of:
    a specific System Information Block (SIB) message such as a System Information Block 1 (SIB1) message, a System Information Block 2 (SIB2) message, or a System Information Block 3 (SIB3) message; or
    a specific notification such as a System Information (SI) change notification, or a Public Warning System (PWS) notification;
    and wherein the specific type of procedure comprises one of:
    a 2-step random access procedure, or a 4-step random access procedure.

8. The method of any preceding aspect, wherein the first set of parameters comprises one or more of:
    a monitoring periodicity;
    a monitoring offset;
    a modification period; and
    a prioritization among CSS and UE-specific search space (USS) monitoring occasions.

9. The method of any preceding aspects, wherein transmitting the indication comprises transmitting the indication via a Physical Uplink Control Channel (PUCCH), a Physical Random Access Channel (PRACH), or a Medium Access Control (MAC) Control Element (CE).

10. The method of any preceding aspects, further comprising:
    prior to transmitting the indication, receiving, from the network entity, a request to transmit the indication.

11. The method of any preceding aspects, wherein a Blind Decoding (BD) budget for the UE is assigned only to the first set of monitoring occasions.

12. The method of any preceding aspects, wherein the indication indicates a CSS monitoring window.

13. The method of aspect 12, wherein the indication further indicates a length of the CSS monitoring window.

14. The method of aspect 12 or 13, wherein the indication is a trigger of the CSS monitoring window.

15. The method of aspect 14, wherein the CSS monitoring window starts after a pre-determined amount of time from transmitting the indication.

16. The method of any aspect 12-15, wherein monitoring control channel candidates comprises monitoring control channel candidates in every slot in the CSS monitoring window.

17. A method of wireless communication at a network entity, comprising:
    receiving, from a user equipment (UE), an indication indicating a first set of parameters determined by the UE for configuring a first set of monitoring occasions to monitor control channel candidates in a common search space (CSS).

18. The method of aspect 17, further comprising:
    transmitting, to the UE, configuration information comprising a second set of parameters for configuring a second set of monitoring occasions for the CSS, wherein the second set of parameters is common for a group of UEs served by the network entity.

19. The method of aspect 18, wherein the first set of monitoring occasions is a subset of the second set of monitoring occasions.

20. The method of any aspect 17-19, wherein the indication indicates a specific type of CSS associated with the first set of parameters.

21. The method of any aspect 17-20, wherein the indication indicates a specific type of message and/or specific type of procedure associated with the first set of parameters.

22. The method of aspect 21, wherein the specific type of message comprises one of:
    a specific System Information Block (SIB) message such as a System Information Block 1 (SIB1) message, a System Information Block 2 (SIB2) message, or a System Information Block 3 (SIB3) message; or
    a specific notification such as a System Information (SI) change notification, or a Public Warning System (PWS) notification;
    and wherein the specific type of procedure comprises one of:
    a specific Random Access Channel (RACH) procedure such as a 2-step RACH, or a 4-step RACH.

23. The method of any aspect 17-22, wherein the first set of parameters comprises one or more of:
    a monitoring periodicity;
    a monitoring offset;
    a modification period; and
    a prioritization among CSS and UE-specific search space (USS) monitoring occasions.

24. The method of any aspect 17-23, wherein receiving the indication comprises receiving the indication via a Physical Uplink Control Channel (PUCCH), a Physical Random Access Channel (PRACH), or a Medium Access Control (MAC) Control Element (CE).

25. The method of any aspect 17-24, further comprising:
    prior to receiving the indication, transmitting, to the UE, a request to transmit the indication.

26. The method of any aspect 17-25, further comprising assigning a Blind Decoding (BD) budget for the UE only to the first set of monitoring occasions.

27. The method of any aspect 17-26, wherein the indication indicates a CSS monitoring window.

28. The method of aspect 28, wherein the indication further indicates a length of the CSS monitoring window.

29. The method of aspect 27 or 28, wherein the indication is a trigger of the CSS monitoring window.

30. The method of aspect 29, wherein the CSS monitoring window starts after a pre-determined amount of time from transmitting the indication.

31. An apparatus for wireless communications by a user equipment (UE), wherein the apparatus includes at least one processor and a memory, wherein the at least one processor and the memory are configured to:
    determine, a first set of parameters for configuring a first set of monitoring occasions for the UE to monitor control channel candidates in a common search space (CSS);
    transmit, to a network entity, an indication indicating the first set of parameters; and
    monitor control channel candidates in the CSS during the first set of monitoring occasions.

32. The apparatus of aspect 31, wherein the at least one processor and the memory are further configured to perform the method of any of aspects 2 to 16.

33. An apparatus for wireless communications by a user equipment (UE), the apparatus comprising:
    means for determining, a first set of parameters for configuring a first set of monitoring occasions for the UE to monitor control channel candidates in a common search space (CSS);
    means for transmitting, to a network entity, an indication indicating the first set of parameters; and means for monitoring control channel candidates in the CSS during the first set of monitoring occasions.

34. The apparatus of aspect 33, further comprising means for carrying out the method of any of aspects 2 to 16.

36. An apparatus for wireless communications by a network entity, wherein the apparatus includes at least one processor and a memory, wherein the at least one processor and the memory are configured to:
  receive, from a user equipment (UE), an indication indicating a first set of parameters determined by the UE for configuring a first set of monitoring occasions to monitor control channel candidates in a common search space (CSS).

37. The apparatus of aspect 36, wherein the at least one processor and the memory are further configured to perform the method of any of aspects 18 to 30.

38. An apparatus for wireless communications by a network entity, the apparatus comprising:
  means for receiving, from a user equipment (UE), an indication indicating a first set of parameters determined by the UE for configuring a first set of monitoring occasions to monitor control channel candidates in a common search space (CSS).

39. The apparatus of aspect 38, further comprising means for carrying out the method of any of aspects 18 to 30.

40. A computer program comprising instructions which, when the program is executed by a user equipment, cause the user equipment to carry out the steps of the aspects of any aspects 1 to 16, or when the program is executed by a network entity, cause the network entity to carry out the steps of the method of any aspects 17 to 30.

What is claimed is:

1. A method of wireless communication at a user equipment (UE), comprising:
  determining a first set of parameters for configuring a first set of monitoring occasions for the UE to monitor control channel candidates in a common search space (CSS);
  receiving a Blind Decoding (BD) budget for the UE only to the first set of monitoring occasions;
  transmitting, to a network entity, an indication indicating the first set of parameters; and
  monitoring control channel candidates in the CSS during the first set of monitoring occasions.

2. The method of claim 1, further comprising:
  receiving, from the network entity, configuration information comprising a second set of parameters for configuring a second set of monitoring occasions for the CSS, wherein the second set of parameters is common for a group of UEs served by the network entity.

3. The method of claim 2, wherein the first set of monitoring occasions is a subset of the second set of monitoring occasions.

4. The method of claim 1, wherein transmitting the indication comprises transmitting the indication in a connected mode of the UE.

5. The method of claim 1, wherein transmitting the indication comprises transmitting the indication via a Physical Uplink Control Channel (PUCCH), a Physical Random Access Channel (PRACH), or a Medium Access Control (MAC) Control Element (CE).

6. The method of claim 1, further comprising:
  prior to transmitting the indication, receiving, from the network entity, a request to transmit the indication.

7. The method of claim 1, wherein the indication indicates a CSS monitoring window.

8. The method of claim 7, wherein the indication further indicates a length of the CSS monitoring window.

9. The method of claim 7, wherein the indication is a trigger of the CSS monitoring window.

10. The method of claim 9, wherein the CSS monitoring window starts after a pre-determined amount of time from transmitting the indication.

11. A method of wireless communication at a network entity, comprising:
  receiving, from a user equipment (UE), an indication indicating a first set of parameters determined by the UE for configuring a first set of monitoring occasions to monitor control channel candidates in a common search space (CSS); and
  assigning a Blind Decoding (BD) budget for the UE only to the first set of monitoring occasions.

12. The method of claim 11, further comprising:
  transmitting, to the UE, configuration information comprising a second set of parameters for configuring a second set of monitoring occasions for the CSS, wherein the second set of parameters is common for a group of UEs served by the network entity.

13. The method of claim 12, wherein the first set of monitoring occasions is a subset of the second set of monitoring occasions.

14. The method of claim 11, further comprising:
  prior to receiving the indication, transmitting, to the UE, a request to transmit the indication.

15. The method of claim 11, wherein the indication is a trigger of the CSS monitoring window.

16. An apparatus for wireless communications by a user equipment (UE), wherein the apparatus includes at least one processor and a memory, wherein the at least one processor and the memory are configured to:
  determine, a first set of parameters for configuring a first set of monitoring occasions for the UE to monitor control channel candidates in a common search space (CSS);
  receive a Blind Decoding (BD) budget for the UE only to the first set of monitoring occasions;
  transmit, to a network entity, an indication indicating the first set of parameters; and
  monitor control channel candidates in the CSS during the first set of monitoring occasions.

17. The apparatus of claim 16, wherein the at least one processor and the memory are further configured to:
  receive, from the network entity, configuration information comprising a second set of parameters for configuring a second set of monitoring occasions for the CSS, wherein the second set of parameters is common for a group of UEs served by the network entity.

18. The apparatus of claim 17, wherein the first set of monitoring occasions is a subset of the second set of monitoring occasions.

19. The apparatus of claim 16, wherein transmitting the indication comprises transmitting the indication in a connected mode of the UE.

20. The apparatus of claim 16, wherein transmitting the indication comprises transmitting the indication via a Physical Uplink Control Channel (PUCCH), a Physical Random Access Channel (PRACH), or a Medium Access Control (MAC) Control Element (CE).

21. The apparatus of claim 16, wherein the at least one processor and the memory are further configured to:
  receive from the network entity, prior to transmitting the indication, a request to transmit the indication.

22. The apparatus of claim 16, wherein the indication indicates a CSS monitoring window.

23. The apparatus of claim 22, wherein the indication further indicates a length of the CSS monitoring window.

24. The apparatus of claim 22, wherein the indication is a trigger of the CSS monitoring window.

25. An apparatus for wireless communications by a network entity, wherein the apparatus includes at least one processor and a memory, wherein the at least one processor and the memory are configured to:
   receive, from a user equipment (UE), an indication indicating a first set of parameters determined by the UE for configuring a first set of monitoring occasions to monitor control channel candidates in a common search space (CSS); and
   assign a Blind Decoding (BD) budget for the UE only to the first set of monitoring occasions.

26. The apparatus of claim 25, wherein the at least one processor and the memory are further configured to:
   transmit, to the UE, configuration information comprising a second set of parameters for configuring a second set of monitoring occasions for the CSS, wherein the second set of parameters is common for a group of UEs served by the network entity.

27. The apparatus of claim 26, wherein the first set of monitoring occasions is a subset of the second set of monitoring occasions.

28. The apparatus of claim 25, wherein the at least one processor and the memory are further configured to:
   transmit to the UE, prior to receiving the indication, a request to transmit the indication.

* * * * *